United States Patent
Varagnat et al.

(10) Patent No.: US 9,453,140 B2
(45) Date of Patent: Sep. 27, 2016

(54) BINDER FOR MAT OF FIBERS, ESPECIALLY MINERAL FIBERS, AND PRODUCTS OBTAINED

(75) Inventors: Matthiue Varagnat, Paris (FR); Boris Jaffennou, Paris (FR); Katarzyna Chuda, Villejuif (FR); Said Lamou, Breda (NL)

(73) Assignee: SAINT-GOBAIN ADFORS, Chambery (FR)

( * ) Notice: Subject to any disclaimer, the term of this patent is extended or adjusted under 35 U.S.C. 154(b) by 413 days.

(21) Appl. No.: 13/883,124

(22) PCT Filed: Nov. 2, 2011

(86) PCT No.: PCT/FR2011/052557
§ 371 (c)(1),
(2), (4) Date: Jul. 18, 2013

(87) PCT Pub. No.: WO2012/059687
PCT Pub. Date: May 10, 2012

(65) Prior Publication Data
US 2013/0295361 A1 Nov. 7, 2013

(30) Foreign Application Priority Data
Nov. 2, 2010 (FR) ...................................... 10 58992

(51) Int. Cl.
| | | |
|---|---|---|
| C09D 131/04 | (2006.01) | |
| D04H 1/587 | (2012.01) | |
| C03C 25/32 | (2006.01) | |
| C08J 5/24 | (2006.01) | |
| D04H 1/4218 | (2012.01) | |
| C09J 103/02 | (2006.01) | |

(52) U.S. Cl.
CPC ............ *C09D 131/04* (2013.01); *C03C 25/321* (2013.01); *C08J 5/24* (2013.01); *C09J 103/02* (2013.01); *D04H 1/4218* (2013.01); *D04H 1/587* (2013.01); *C08J 2303/02* (2013.01); *C08J 2305/02* (2013.01); *C08J 2431/04* (2013.01); *Y10T 442/60* (2015.04); *Y10T 442/631* (2015.04)

(58) Field of Classification Search
None
See application file for complete search history.

(56) References Cited

U.S. PATENT DOCUMENTS

| | | | |
|---|---|---|---|
| 5,318,990 A * | 6/1994 | Strauss ..................... | C08F 8/14 524/549 |
| 5,340,868 A | 8/1994 | Strauss et al. | |
| 5,661,213 A | 8/1997 | Arkens et al. | |
| 5,895,804 A | 4/1999 | Lee et al. | |
| 5,932,689 A | 8/1999 | Arkens et al. | |
| 5,977,232 A | 11/1999 | Arkens et al. | |
| 6,071,994 A | 6/2000 | Hummerich et al. | |
| 6,099,773 A | 8/2000 | Reck et al. | |
| 6,146,746 A | 11/2000 | Reck et al. | |
| 6,331,350 B1 | 12/2001 | Taylor et al. | |
| 2002/0091185 A1 | 7/2002 | Taylor et al. | |
| 2002/0188055 A1 | 12/2002 | Chen et al. | |
| 2003/0008978 A1 | 1/2003 | Chen et al. | |
| 2004/0002567 A1 | 1/2004 | Chen et al. | |
| 2005/0215153 A1 * | 9/2005 | Cossement et al. .......... | 442/180 |
| 2007/0027283 A1 | 2/2007 | Swift et al. | |
| 2007/0123679 A1 | 5/2007 | Swift et al. | |
| 2007/0123680 A1 * | 5/2007 | Swift et al. ................... | 527/312 |
| 2007/0142596 A1 | 6/2007 | Swift et al. | |
| 2010/0129593 A1 * | 5/2010 | Rempt ....................... | C08L 3/02 428/95 |
| 2010/0130649 A1 | 5/2010 | Swift et al. | |
| 2010/0282996 A1 | 11/2010 | Jaffrennou et al. | |
| 2010/0330376 A1 * | 12/2010 | Trksak .................... | C08B 11/08 428/426 |
| 2011/0086567 A1 * | 4/2011 | Hawkins ............. | C03C 25/1095 428/292.1 |
| 2011/0135937 A1 | 6/2011 | Swift et al. | |
| 2011/0220835 A1 | 9/2011 | Swift et al. | |

FOREIGN PATENT DOCUMENTS

| | | |
|---|---|---|
| EP | 2 192 153 | 6/2010 |
| WO | 2006 120523 | 11/2006 |
| WO | 2009 080938 | 7/2009 |

OTHER PUBLICATIONS

[NPL #1] "MSDS—Ammonia (liquid)", AFROX (May 2010); <http://www.afrox.co.za/internet.global.corp.zaf/en/images/Ammonia266__27591.pdf>.*
International Search Report Issued Feb. 3, 2012 in PCT/FR11/52557 Filed Nov. 2, 2011.

* cited by examiner

*Primary Examiner* — David Sample
*Assistant Examiner* — Donald M Flores, Jr.
(74) *Attorney, Agent, or Firm* — Oblon, McClelland, Maier & Neustadt, L.L.P.

(57) ABSTRACT

The present invention concerns a binder for a mat of fibers, especially mineral fibers, which comprises:
- at least one monosaccharide and/or at least one polysaccharide;
- at least one polycarboxylic organic acid with a molar mass of 1000 or less;
- and at least one vinyl acetate homopolymer or copolymer.

It also concerns the products resulting from treatment of the fibers, especially mineral, with said binder.

33 Claims, No Drawings

BINDER FOR MAT OF FIBERS, ESPECIALLY MINERAL FIBERS, AND PRODUCTS OBTAINED

CROSS REFERENCE TO RELATED APPLICATIONS

The present application is a 35 U.S.C. §371 national stage patent application of International patent application PCT/FR2011/052557, filed on Nov. 2, 2011, published as WO 2012/059687 on May 10, 2012, the text of which is incorporated by reference, and claims the benefit of the filing date of French application No. 1058992, filed on Nov. 2, 2010, the text of which is also incorporated by reference.

The present invention relates to the field of mats comprising fibers, in particular mineral fibers, bonded by a formaldehyde-free organic binder.

More particularly, the invention relates to a binder that can be heat-cured that comprises at least one monosaccharide and/or polysaccharide, at least one polycarboxylic organic acid with a molar mass of less than 1000 and at least one vinyl acetate homopolymer or copolymer, and mineral fiber mats, in particular glass or rock, which result therefrom.

Mineral fiber mats (also known as "non-wovens" or "veils") can be manufactured using known processes operating by means of dry or wet procedures.

In the dry procedure, molten mineral matter contained in a furnace is routed to an assembly of dies from which filaments flow under gravity and are stretched by a gaseous fluid. The mineral filaments are harvested on a conveyer where they become entangled, forming a mat.

A binder is applied to the upper face of the mat thus formed using suitable equipment, usually by curtain coating, and the excess binder is eliminated by suction from the opposite face. The mat then enters equipment containing hot air wherein the temperature, of the order of 200° C. to 250° C., can eliminate water and cure the binder over a very short time period, of the order of about 10 seconds to 1 minute; the mineral fiber mat is then collected in the form of a roll.

In the wet procedure, the mat is obtained from an aqueous dispersion of cut mineral fibers that is deposited by means of a forming head onto a conveyor provided with perforations; water is extracted through the conveyor by means of a suction box. The cut mineral fibers remaining on the conveyor form a mat that is treated under conditions that are the same as those described for the dry procedure.

In the procedures mentioned above, the binder acts to bind the mineral fibers together and to provide the mat containing them with mechanical properties that are suitable for the desired usage, in particular sufficient rigidity to be able to be handled easily, in particular without running the risk of being torn.

The binder to be applied to the mineral fibers is generally in the form of an aqueous solution comprising at least one thermoset resin and additives such as a curing catalyst for the resin, an adhesion-promoting silane, a water repellent, etc.

The most widely used thermoset resins are resins based on formaldehyde, in particular phenolic resins belonging to the resol family, urea-formaldehyde resins and melamine-formaldehyde resins. Such resins have good curing properties under the thermal conditions mentioned above, are soluble in water, have good affinity for the mineral fibers and are also relatively cheap.

However, such resins tend to contain free formaldehyde, the presence of which is not wanted due to undesirable effects from a health and safety and environmental standpoint. For a number of years, environmental protection regulations have been becoming stricter; this has obliged resin and fiber mat manufacturers to investigate solutions that can be used to reduce the quantity of free formaldehyde still further.

Solutions that replace formaldehyde-based resins for binding mineral fibers are known and are based on the use of a carboxylic acid polymer, in particular an acrylic acid polymer, in combination with a β-hydroxylamide and a monomeric, at least trifunctional, carboxylic acid (U.S. Pat. No. 5,340,868).

Adhesive compositions have been proposed that comprise a polycarboxylated polymer, a polyol and a catalyst, wherein the catalyst is a phosphorus-containing catalyst (U.S. Pat. Nos. 5,318,990, 5,661,213, 6,331,350, US 2003/0008978), a fluoroborate (U.S. Pat. No. 5,977,232) or a cyanamide, a dicyanamide or a cyanoguanidine (U.S. Pat. No. 5,932,689).

Adhesive compositions have also been described that comprise an alkanolamine comprising at least two hydroxyl groups and a polycarboxylated polymer (U.S. Pat. Nos. 6,071,994, 6,099,773, 6,146,746, US 2002/0091185) associated with a copolymer (U.S. Pat. No. 6,299,936), a cationic, amphoteric or nonionic surfactant (US 2002/0188055) or a silane (US 2004/0002567).

In US 2005/0215153, the adhesive composition is formed from a pre-binder containing a carboxylic acid polymer and a polyol, with a dextrin as a co-binder.

Further, adhesive compositions based on heat-curable saccharides are known.

In U.S. Pat. No. 5,895,804, the adhesive composition comprises a polycarboxylic polymer containing at least two carboxylic acid functional groups and having a molecular weight of at least 1000, and a polysaccharide with a molecular weight of at least 10 000.

WO 2009/080938 describes a sizing composition for mineral wool or a veil of mineral fibers comprising at least one monosaccharide and/or at least one polysaccharide and at least one polycarboxylic organic acid with a molar mass of 1000 or less.

The aim of the present invention is to propose a binder for mats of fibers, especially mineral, and in particular glass or rock, which is free of formaldehyde and which has improved resistance to aging in a moist medium while retaining its good mechanical properties, in particular good tensile strength.

To this end, the present invention proposes a binder that comprises:
  at least one monosaccharide and/or at least one polysaccharide;
  at least one polycarboxylic organic acid with a molar mass of 1000 or less;
  and at least one vinyl acetate homopolymer or copolymer.

The monosaccharide is selected from monosaccharides containing 3 to 8 carbon atoms, preferably aldoses and advantageously aldoses containing 5 to 7 carbon atoms, in particular natural (belonging to the D series). Particularly preferred aldoses are hexoses such as glucose, mannose or galactose.

The polysaccharide in accordance with the invention may be any saccharide constituted by a plurality of saccharide motifs, preferably primarily (more than 50% by weight) constituted by glucose motifs. The molar mass of the polysaccharide may vary widely and includes dextrins and starches, in particular starches with a molar mass of at least $10^5$ g/mol and possibly up to $10^9$ g/mol.

In a preferred embodiment, the invention employs a mixture of monosaccharide(s) and/or polysaccharide(s), in particular a dextrin, molasses or a mixture containing 20% to 80% by weight of starch(es), preferably 40% to 60%.

Dextrins are compounds with general formula $(C_6H_{10}O_5)_n$ obtained by the partial hydrolysis of starch. Processes for preparing dextrins are known. As an example, dextrins may be prepared by heating a starch or drying it to dryness, generally in the presence of an acid catalyst, which results in rupture of the amylose and amylopectin molecules that constitute said starch into products with a lower molar mass. Dextrins may also be obtained by treating starch enzymatically with one or more amylases, in particular microbial amylases, which can hydrolyze the bonds in the starch. The nature of the treatment (chemical or enzymatic) and the hydrolysis conditions have a direct influence on the mean molar mass and the molar mass distribution of the dextrin.

Dextrins in accordance with the invention may be obtained from starch or from derivatives of starch of diverse vegetable origins, for example from tubers such as potato, cassava, maranta or sweet potato, from grains such as wheat, corn, rye, rice, barley, millet, oats or sorghum, from fruit such as chestnut, ground nuts or hazelnuts, or from legumes such as peas or beans.

Dextrins with a dextrose equivalent, DE, in the range 5 to 100, preferably in the range 15 to 100, and advantageously in the range 15 to 50, are particularly preferred.

Conventionally, the dextrose equivalent, DE, is defined by the following relationship:

$$DE = 100 \times \left(\frac{\text{number of ruptured glycoside bonds}}{\text{number of glycoside bonds in initial starch}}\right)$$

Molasses are residues from sugar refining, extracted from cane and beet in particular; it has a high glucides content, of the order of 40% to 60% by weight. Most of the glucides in molasses is constituted by saccharose.

The molasses for the invention preferably comprise 45% to 50% by weight of total glucides, expressed in terms of saccharose.

Sugar beet molasses are particularly preferred.

Particularly preferably, the invention uses a mixture of glucose and starch(es), or a mixture of dextrin(s) with a DE that is in the range 20 to 40, and starch(es).

The term "polycarboxylic organic acid" means an organic acid comprising at least two carboxylic functions, preferably at most 4, and advantageously at most 3 carboxylic functions.

The polycarboxylic organic acid acts as a curing agent; it is capable of reacting with the monosaccharide(s) and/or the polysaccharide(s) under the effect of heat to form ester linkages that lead to the production of a polymeric network in the final binder. Said polymeric network means that bonds can be established at junction points of the mineral fibers in the final mat.

The polycarboxylic organic acid is selected from polycarboxylic organic acids having a molar mass of 1000 or less, preferably 750 or less and advantageously 500 or less.

Preferably, the polycarboxylic organic acid is a saturated or unsaturated, branched or non-branched alicyclic acid, a cyclic acid or an aromatic acid.

The polycarboxylic organic acid may be a dicarboxylic acid, for example oxalic acid, malonic acid, succinic acid, glutaric acid, adipic acid, pimelic acid, suberic acid, azelaic acid, sebacic acid, malic acid, tartaric acid, tartronic acid, aspartic acid, glutamic acid, fumaric acid, itaconic acid, maleic acid, traumatic acid, camphoric acid, phthalic acid and its derivatives, in particular containing at least one boron or chlorine atom, tetrahydrophthalic acid and its derivatives, in particular containing at least one chlorine atom, such as chlorendic acid, isophthalic acid, terephthalic acid, mesaconic acid or citraconic acid, or a dicarboxylic acid precursor, in particular an anhydride such as maleic anhydride, succinic anhydride or phthalic anhydride; a tricarboxylic acid, for example citric acid, tricarballylic acid, 1,2,4-butanetricarboxylic acid, aconitic acid, hemimellitic acid, trimellitic acid or trimesic acid; a tetracarboxylic acid, for example 1,2,3,4-butanetetracarboxylic acid or pyromellitic acid. Preferred acids are malonic, tartaric and citric acids, more preferably citric acid.

The vinyl acetate polymer may be a homopolymer or a copolymer, for example of at least one hydrophobic monomer such as ethylene, propylene, butylene, styrene or vinyl chloride, in particular a copolymer of ethylene and vinyl acetate (EVA).

Without wishing to be bound by any particular theory, the inventors are of the opinion that the presence of hydrophobic monomers contributes to reducing the affinity of the mat for water and makes the copolymer capable of migrating more easily on the surface of the mat, which results in more rapid elimination of the water contained in the mat from the first seconds of the heat treatment, ultimately leading to better curing of the binder.

In the binder, the monosaccharide and/or polysaccharide represent(s) 10% to 90% by weight of the mixture constituted by the monosaccharide and/or the polysaccharide and the polycarboxylic organic acid, preferably 20% to 85%, and advantageously 30% to 80%.

Preferably, and as indicated above, at least 50% by weight of the monosaccharide and/or polysaccharide is constituted by starch(es), advantageously as a mixture with glucose or a dextrin.

The vinyl acetate polymer is present in the binder in an amount of 1 to 15 parts by weight per 100 parts by weight of the mixture constituted by the monosaccharide and/or the polysaccharide and the polycarboxylic organic acid, preferably 2 to 8 parts by weight.

The binder may also comprise a catalyst, acidic or basic, which primarily functions to adjust the curing onset temperature.

The catalyst may be selected from Lewis acids and bases, such as clays, colloidal or non-colloidal silica, organic amines, quaternary amines, metallic oxides, metallic sulfates, metallic chlorides, urea sulfates, urea chlorides and silicate-based catalysts.

The catalyst may also be a compound containing phosphorus, for example an alkali metal hypophosphite salt, an alkali metal phosphite, an alkali metal polyphosphate, an alkali metal hydrogen phosphate, a phosphoric acid or an alkylphosphonic acid. Preferably, the alkali metal is sodium or potassium.

The catalyst may also be a compound containing fluorine and boron, for example tetrafluoroboric acid or a salt of said acid, in particular a tetrafluoroborate of an alkali metal such as sodium or potassium, a tetrafluoroborate of an alkaline-earth metal such as calcium or magnesium, a zinc tetrafluoroborate or an ammonium tetrafluoroborate.

Preferably, the catalyst is sodium hypophosphite.

The quantity of catalyst in the binder may represent up to 20% of the weight of the monosaccharide and/or polysaccharide and the polycarboxylic organic acid, preferably up to 10%; advantageously, it is at least 1%.

The binder of the invention may also comprise the conventional additives below in the following proportions, calculated on the basis of 100 parts by weight of the monosaccharide(s) and/or polysaccharide(s) and the polycarboxylic organic acid:

- 0 to 1 part by weight of silane, in particular an aminosilane, preferably 0.1 to 0.5 part; and
- 0 to 5 parts by weight of a silicone, a vegetable oil or a fluorinated compound, preferably 0.1 to 1 part.

The role of additives is known and will be briefly summarized here: the silane is a coupling agent between the fibers and the binder and also acts as an anti-aging agent; the silicone, vegetable oil or fluorinated compound are water repellents that function to reduce absorption of water by the mineral fiber mat.

The binder is in the form of an emulsion or an aqueous dispersion with an acidic pH, of the order of 1 to 5 depending on the polycarboxylic organic acid used, preferably 1.5 or higher.

The binder is intended to be applied to fiber mats of any nature, whether mineral and/or organic, preferably mineral. The present invention also provides mats of fibers bonded by the binder of the invention.

The mineral fibers may be constituted by glass or a rock, in particular basalt, preferably glass.

Conventionally, the binder is deposited on the mineral fiber mat (formed by the dry or wet procedure), then the mat is treated at a temperature that allows curing of the binder, which then becomes infusible. Curing of the binder of the invention is carried out at a temperature comparable to that of a conventional resin containing formaldehyde, which is generally in the range 200° C. to 220° C., and for a very short duration, of the order of a few seconds to 1 minute.

The mineral fibers can be filaments as well as threads composed of a multitude of filaments bound together, in particular using a size, and assemblies of such threads.

Thus, in a first embodiment, the mineral fiber mat is composed of discontinuous mineral filaments with a length that can be up to 150 mm, preferably in the range 20 to 100 mm and advantageously in the range 50 to 70 mm, and with a diameter that may vary widely, for example from 5 to 30 µm.

In a second embodiment, the mineral fiber mat is composed of mineral threads.

The mineral threads may be threads composed of a multitude of mineral filaments (or base threads) or of said base threads assembled into rovings.

The threads cited above may be untwisted threads or twisted (textile) threads, preferably untwisted.

The mineral threads, in particular glass, are generally cut to a length that may be up to 100 mm, preferably in the range 6 to 30 mm, advantageously 8 to 20 mm and more preferably 10 to 18 mm.

The diameter of the glass filaments constituting the threads may vary widely, for example from 5 to 30 µm. In the same manner, there may be large variations in the linear density of the thread, which may be from 34 to 1500 tex.

The glass constituting the filaments may be of any type, for example C, E, R or AR (alkali-resistant). C glass is preferred.

The organic fibers may be synthetic fibers or natural fibers.

Examples of synthetic fibers that may be cited are fibers based on an olefin such as polyethylene or polypropylene, an alkylene polyterephthalate such as ethylene polyterephthalate, or a polyester.

Examples of natural fibers that may be cited are vegetable fibers, in particular cotton, coconut, sisal, hemp or linen, and animal fibers, in particular silk or wool.

If necessary, the mat may be reinforced with continuous fibers that are generally deposited on the mat conveying device, in the direction of advance of the mat, and distributed over all or a portion of the width of the mat. Such fibers are generally deposited in the thickness of the mat of fibers, especially mineral, before application of the binder.

The reinforcing fibers may be mineral and/or organic fibers of the same chemical nature as the fibers cited above constituting the fiber mat of the invention.

Glass reinforcing fibers are preferred.

The mat of fibers, in particular mineral, generally has a mass per unit area in the range 10 to 1100 g/m$^2$, preferably 30 to 350 g/m$^2$, advantageously 35 to 60 g/m$^2$.

The binder generally represents 10% to 35% of the weight of the mat of fibers, in particular mineral, preferably 13% to 25%.

As a general rule, the fibers constituting the mat of the invention are constituted by more than 50% by weight mineral fibers, preferably more than 75% and advantageously 100%. Particularly preferably, the fibers are formed from glass.

The mineral fiber mat of the present invention may be used in many applications, for example as a coating, for painting or otherwise, for application to walls and/or ceilings, a surface coating or for joining plaster or cement panels, a surface coating for thermal insulation and/or sound products such as a mineral wool or a foam intended more particularly for the insulation of roofs, membranes for sealing roofs, in particular shingles, or to produce a floor covering, in particular an acoustic sub-layer.

Using a mat in accordance with the present invention as a surface coating for insulation products based on mineral wool has proved to be particularly advantageous.

The following examples serve to illustrate the invention without in any way limiting its scope.

In these examples, the breaking stress of a 5 cm×25 cm sample fixed by one end was measured on a draw rig at a continuous elongation of 40 mm/minute. The breaking stress was expressed in N/5 cm.

The breaking stress was measured after (initial) manufacture and after the sample had been treated under accelerated aging conditions in an oven heated to 50° C. at 98% relative humidity for 3 days, on the one hand, and in water at 80° C. for 10 minutes, on the other hand. The results are expressed as the percentage retention, which is equal to: (breaking stress after treatment/initial breaking stress).

EXAMPLES 1 TO 6

These examples were designed to compare the binders.

Binders comprising the constituents shown in Table 1 were prepared in quantities expressed in parts by weight of solid matter.

The binders were prepared by introducing the various constituents into a receptacle containing water at ambient temperature, with moderate agitation. The starch had already been treated in an autoclave (130° C.; 2 bar).

The quantity of solid matter (dry extract) of the binders is equal to 30%.

A glass fiber microfilter (Whatman GF/A, 50 g/m², supplied by Whatman) was immersed in the binder for 30 seconds, then the excess was eliminated by suction. The microfilter was then treated in an oven at 200° C. for 135 seconds. When finished, the microfilter contained 45% of binder.

For the purposes of comparison, a microfilter was also immersed, under the conditions cited above, in a binder comprising a traditional formophenolic resol type resin (reference).

The properties of each microfilter are given in Table 1.

EXAMPLES 7 TO 10 a) Preparation of Binders

Binders comprising the constituents appearing in Table 2 were prepared in quantities expressed in parts by weight of solid matter under the conditions of Examples 1 to 6.

The quantity of solid matter (dry extract) of the binders was equal to 30%.

b) Manufacture of Mats

A 40 g/m² mat of C glass fibers was manufactured in a 1.3 m wide industrial unit using the dry procedure, said mat being collected in the form of a 200 m long roll. The binder was applied by curtain coating and represented 15% of the weight of the finished mat.

By way of comparison, a mat was also prepared under the conditions cited above, using a binder comprising a traditional resol type formophenolic resin (reference).

Two series of 5 cm×25 cm samples were cut out, one in the "machine direction" (the length being disposed in the direction of advance of the mat) and the other in the "transverse direction" (90° to the preceding direction). The results mentioned in Table 2 were calculated using the following relationship:

$$(BS_m + BS_t)/2 \times (40/x)$$

in which $BS_m$ is the breaking stress in the machine direction, in N/5 cm;

$BS_t$ is the breaking stress in the transverse direction, in N/5 cm;

40 is the target grammage, in g/m²;

x is the measured grammage, in g/m².

The properties of each mat are given in Table 2.

TABLE 1

|  | Ex. 1 | Ex. 2 | Ex. 3 (comp.) | Ex. 4 (comp.) | Ex. 5 (comp.) | Ex. 6 (Ref.) |
|---|---|---|---|---|---|---|
| Composition of binder |  |  |  |  |  |  |
| saccharide |  |  |  |  |  |  |
| dextrin[1] | 31 | 31 | 31 | 31 | 31 | — |
| starch[2] | 31 | 31 | 31 | 31 | 31 | — |
| citric acid | 38 | 38 | 38 | 38 | 38 | — |
| polymer |  |  |  |  |  |  |
| PVAc[3] | 5 | — | — | — | — | — |
| EVA[4] | — | 5 | — | — | — | — |
| PVOH[5] | — | — | 5 | — | — | — |
| styrene-acrylate[6] | — | — | — | 5 | — | — |
| catalyst |  |  |  |  |  |  |
| Na hydrogen sulfate | 5 | 5 | 5 | 5 | 5 | — |
| silicone[7] | 0.1 | 0.1 | 0.1 | 0.1 | 0.1 | — |
| Properties of microfilter Breaking stress (N/5 cm) |  |  |  |  |  |  |
| initial | 86 | 98 | 111 | 90 | 99 | 111 |
| % retention after accelerated aging | 71 | 75 | 31 | 19 | 55 | 63 |
| % retention after treatment in water | 61 | 45 | 30 | 50 | 35 | 67 |

[1] supplied under reference Roclys C3072S by Roquette Frères; mass average molar mass: 3510; dextrose equivalent (DE): 30
[2] supplied under reference Tackidex G076 by Roquette Frères; 75% by weight amylopectin, 25% by weight amylose
[3] supplied under reference Vinavil® KA/R by Vinavil
[4] supplied under reference Vinamul® 3301 by Vinamul
[5] supplied under reference Mowiol® 4088 by KSE
[6] supplied under reference Acronal® 280 KD by BASF
[7] supplied under reference silicone oil PD633-1 by Govi

TABLE 2

|  | Ex. 7 | Ex. 8 (comp.) | Ex. 9 (comp.) | Ex. 10 Ref. |
|---|---|---|---|---|
| Composition of binder |  |  |  |  |
| saccharide |  |  |  |  |
| dextrin[1] | 31 | 31 | 31 | — |
| starch[2] | 31 | 31 | 31 | — |
| citric acid | 38 | 38 | 38 | — |
| polymer |  |  |  |  |
| PVAc[3] | 5 | — | — | — |
| PVOH[5] | — | — | 5 | — |
| catalyst |  |  |  |  |
| Na hydrogen sulfate | 5 | 5 | 5 | — |
| silicone[7] | 0.5 | 0.5 | 0.5 | — |
| silane[8] | 0.1 | 0.1 | 0.1 | — |
| Properties of mat Breaking stress (N/5 cm) |  |  |  |  |
| initial | 64 | 55 | 68 | 75 |
| % retention after accelerated aging | 92 | 86 | 99 | 86 |
| % retention after treatment in water | 37 | 6 | 8 | 57 |

[1] supplied under reference Roclys C3072S by Roquette Frères; mass average molar mass: 3510; dextrose equivalent (DE): 30
[2] supplied under reference Tackidex G076 by Roquette Frères; 75% by weight amylopectin, 25% by weight amylose
[3] supplied under reference Vinavil® KA/R by Vinavil
[4] supplied under reference Vinamul® 3301 by Vinamul
[5] supplied under reference Mowiol® 4088 by KSE
[6] supplied under reference Acronal® 280 KD by BASF
[7] supplied under reference silicone oil PD633-1 by Govi
[8] supplied under reference Silquest® A1100 by Crompton; gamma aminopropyltriethoxysilane

The invention claimed is:

1. A binder comprising:
    at least one monosaccharide, polysaccharide, or mixture thereof;
    at least one polycarboxylic organic acid having a molar mass of 1000 or less, wherein the polycarboxylic organic is at least one saturated or unsaturated, branched or non-branched, alicyclic acid, cyclic acid or aromatic acid; and
    at least one vinyl acetate homopolymer or copolymer, wherein the vinyl acetate copolymer is a copolymer of vinyl acetate and at least one hydrophobic monomer selected from the group consisting of ethylene, propylene, butylene, styrene, and vinyl chloride.

2. The binder of claim 1, wherein a monosaccharide is present and is a monosaccharide comprising 3 to 8 carbon atoms.

3. The binder of claim 2, wherein the monosaccharide is a hexose.

4. The binder of claim 1, wherein a polysaccharide is present, wherein more than 50% of the polysaccharide comprises glucose units.

5. The binder of claim 4, wherein the polysaccharide comprises a dextrin and a starch.

6. The binder of claim 1, comprising a dextrin, molasses, or a mixture of the dextrin or molasses with a starch, wherein the mixture comprises 20% to 80% by weight of a starch.

7. The binder of claim 6, wherein the dextrin has a dextrose equivalent value in the range 5 to 100.

8. The binder of claim 1, wherein the polycarboxylic organic acid comprises at least two carboxylic functional groups.

9. The binder of claim 8, wherein the polycarboxylic organic acid has a molar mass of 750 or less.

10. The binder of claim 1, wherein the monosaccharide, the polysaccharide, or the mixture thereof is 10% to 90% of the weight of the mixture comprising the monosaccharide, the polysaccharide, or the mixture thereof and the polycarboxylic organic acid.

11. The binder of claim 1, wherein the vinyl acetate polymer is present in an amount of 1 to 15 parts per 100 parts by weight of the mixture constituted by the monosaccharide, the polysaccharide, or the mixture thereof and the polycarboxylic organic acid.

12. The binder of claim 1, further comprising a catalyst, wherein the catalyst is selected from the group consisting of a Lewis acid, a Lewis base, a compound comprising phosphorus, and a compound comprising fluorine and boron.

13. The binder of claim 12, wherein the catalyst is up to 20% of the weight of the monosaccharide, the polysaccharide, or the mixture thereof and the polycarboxylic organic acid.

14. The binder of claim 1, further comprising, based on 100 parts by weight of the monosaccharide, the polysaccharide, or the mixture thereof and the polycarboxylic organic acid:
   up to 1 part of a silane; and
   up to 5 parts of a silicone, a vegetable oil, or a fluorinated compound.

15. The binder of claim 1, wherein the polycarboxylic organic acid has a molar mass of 500 or less.

16. The binder of claim 1, wherein the polycarboxylic organic acid having a molar mass of 1000 or less is a dicarboxylic acid, an anhydride, a tricarboxylic acid or a tetracarboxylic acid.

17. The binder of claim 1, which is free of formaldehyde.

18. A fiber mat, comprising fibers and a binder comprising:
   at least one monosaccharide, polysaccharide, or mixture thereof;
   at least one polycarboxylic organic acid having a molar mass of 1000 or less, wherein the polycarboxylic organic acid is selected from the group consisting of malonic acid, tartaric acid, citric acid, and mixtures thereof; and
   at least one vinyl acetate homopolymer or copolymer, wherein the vinyl acetate copolymer is a copolymer of vinyl acetate and at least one hydrophobic monomer selected from the group consisting of ethylene, propylene, butylene, styrene, and vinyl chloride,
   wherein the mat has a mass per unit area of 10 to 1100 g/m$^2$.

19. The mat of claim 18, wherein the fibers are mineral fibers.

20. The mat of claim 18, wherein the fibers are in the form of discontinuous mineral filaments, mineral threads comprising a multitude of mineral filaments, or a mineral threads comprising a multitude of mineral filaments assembled into rovings.

21. The mat of claim 18, wherein the binder is from 10% to 35% of the weight of the mat.

22. The mat of claim 18, wherein the fibers comprise more than 50% by weight of mineral fibers.

23. The mat of claim 22, wherein the fibers are formed from glass.

24. The mat of claim 18, wherein the polycarboxylic organic acid having a molar mass of 1000 or less comprises at least one member selected from the group consisting of tartaric acid and citric acid.

25. The mat of claim 18, wherein the polycarboxylic organic acid having a molar mass of 1000 or less is citric acid.

26. The mat of claim 18, wherein the binder comprises a monosaccharide that is a hexose.

27. The mat of claim 18, wherein a polysaccharide is present in the binder and wherein more than 50% of the polysaccharide comprises glucose units.

28. The mat of claim 27, wherein the polysaccharide comprises a dextrin and a starch.

29. The mat of claim 18, wherein, in the binder, the monosaccharide, the polysaccharide, or the mixture thereof is 10% to 90% of the weight of the mixture comprising the monosaccharide, the polysaccharide, or the mixture thereof and the polycarboxylic organic acid in the binder.

30. The mat of claim 18, wherein, in the binder, the vinyl acetate polymer is present in an amount of 1 to 15 parts per 100 parts by weight of the mixture constituted by the monosaccharide, the polysaccharide, or the mixture thereof and the polycarboxylic organic acid.

31. The mat of claim 18, wherein the binder further comprises a catalyst, wherein the catalyst is selected from the group consisting of a Lewis acid, a Lewis base, a compound comprising phosphorus, and a compound comprising fluorine and boron.

32. The mat of claim 18, wherein the binder further comprises, based on 100 parts by weight of the monosaccharide, the polysaccharide, or the mixture thereof and the polycarboxylic organic acid:
   up to 1 part of a silane; and
   up to 5 parts of a silicone, a vegetable oil, or a fluorinated compound.

33. The mat of claim 18, wherein the binder is free of formaldehyde.

* * * * *

UNITED STATES PATENT AND TRADEMARK OFFICE
CERTIFICATE OF CORRECTION

PATENT NO. : 9,453,140 B2  
APPLICATION NO. : 13/883124  
DATED : September 27, 2016  
INVENTOR(S) : Matthieu Varagnat et al.

Page 1 of 1

It is certified that error appears in the above-identified patent and that said Letters Patent is hereby corrected as shown below:

On the Title Page

Item (75), the 1st Inventor's Name and the 2nd Inventor's Name are incorrect. Item (75) should read:
-- (75) Inventors: Matthieu Varagnat, Paris (FR); Boris Jaffrennou, Paris (FR); Katarzyna Chuda, Villejuif (FR); Said Lamou, Breda (NL) --

Signed and Sealed this  
Twentieth Day of March, 2018

Andrei Iancu  
*Director of the United States Patent and Trademark Office*